United States Patent [19]

Miller

[11] 4,416,195

[45] Nov. 22, 1983

[54] PIMENTO CORING MACHINE

[75] Inventor: William T. Miller, Haddock, Ga.

[73] Assignee: Cherokee Products Company, Haddock, Ga.

[21] Appl. No.: 458,483

[22] Filed: Jan. 17, 1983

[51] Int. Cl.³ .......................... A23N 4/00; A23N 4/12; A23N 7/08

[52] U.S. Cl. ........................................ 99/544; 99/547; 99/551; 99/553; 99/564; 198/855

[58] Field of Search .............. 99/486, 443 C, 489–492, 99/542–545, 494, 514, 537, 547, 549, 564, 552–555, 564, 551, 635, 637, 642, 643, 559–561, 565, 566; 198/854–859; 83/58, 60, 61, 62, 62.1, 63, 66, 155

[56] References Cited

U.S. PATENT DOCUMENTS

| | | | |
|---|---|---|---|
| 2,683,477 | 7/1954 | Altman | 99/546 |
| 4,112,837 | 9/1978 | Altman et al. | 99/537 |
| 4,252,056 | 2/1981 | Altman | 99/551 |
| 4,337,693 | 7/1982 | Dandrea | 99/545 X |

*Primary Examiner*—Timothy F. Simone
*Attorney, Agent, or Firm*—Newton, Hopkins & Ormsby

[57] ABSTRACT

To prevent damaging the rotary reciprocating knives and/or the cups which hold the fruit in a pimento coring machine caused by non-synchronous operation of the fruit conveyor and the reciprocating knife carriage, a sensing probe on the carriage near its lower end engages a roller of the chain to prevent complete descent of the knife carriage, thus protecting the knives and cups when the non-synchronous condition exists. When the chain is properly synchronized with the knife carriage, the probe can enter a space between two rollers and two side links of the dwelling chain so as to allow full descent of the knife carriage and knives.

12 Claims, 7 Drawing Figures

PIMENTO CORING MACHINE

BACKGROUND OF THE INVENTION

This invention relates to improvements in the type of pimento coring machine disclosed in U.S. Pat. No. 2,683,477 to Altman. The machine disclosed in the patent includes a horizontal chain conveyor having spaced cross bars mounting rows of pimento holding cups. The conveyor chains are achieved in a step-by-step move and dwell mode to position consecutive rows of pimentos under rotary coring knives which are mounted on a vertically reciprocating carriage above the conveyor. When the movements of the carriage and conveyor become slightly non-synchronized in the patented machine, the descending rotary knives can strike the stainless steel holding cups on the conveyor cross bars which are formed of stainless steel, and destroy both the knives and cups. When the machine is properly synchronized, the descending knives are coaxially aligned with the cups and they will properly core the pimentos in the cups without contacting the cups.

The principal objective of the invention, therefore, is to provide a means which will prevent damage to, or destruction of, the knives and cups in a machine of the Altman type whenever the fruit conveyor and reciprocating knife carriage are not properly synchronized.

A further important object of the invention is to provide such a means or device which does not interfere with the regular and normal operation of the machine when its conveyor and reciprocating carriage are synchronized.

Briefly, in its essence, the invention consists of a mechanical sensing probe bodily mounted on the lower end of the vertically reciprocating knife carriage above and in alignment with the underlying fruit conveyor chaine. If the conveyor is out of synchronization with the carriage, when the carriage descends, the probe will strike a chain roller during a dwell of the conveyor and arrest the descent of the carriage, so that its rotating knives cannot strike the pimento holding cups on the conveyor. If the conveyor and carriage are properly synchronized, the probe can cleanly penetrate the conveyor chain while the latter is at a dwell by entering a space defined by two adjacent chain rollers and two side links. The device is extremely simple, effective and economical to manufacture. It can be added to new or extending machines without difficulty and does not significantly alter the machine structure or change the basic mode of operation of the machine in any way.

Other features and advantages of the invention will become apparent during the course of the following description.

DETAILED DESCRIPTION

Figure 1:
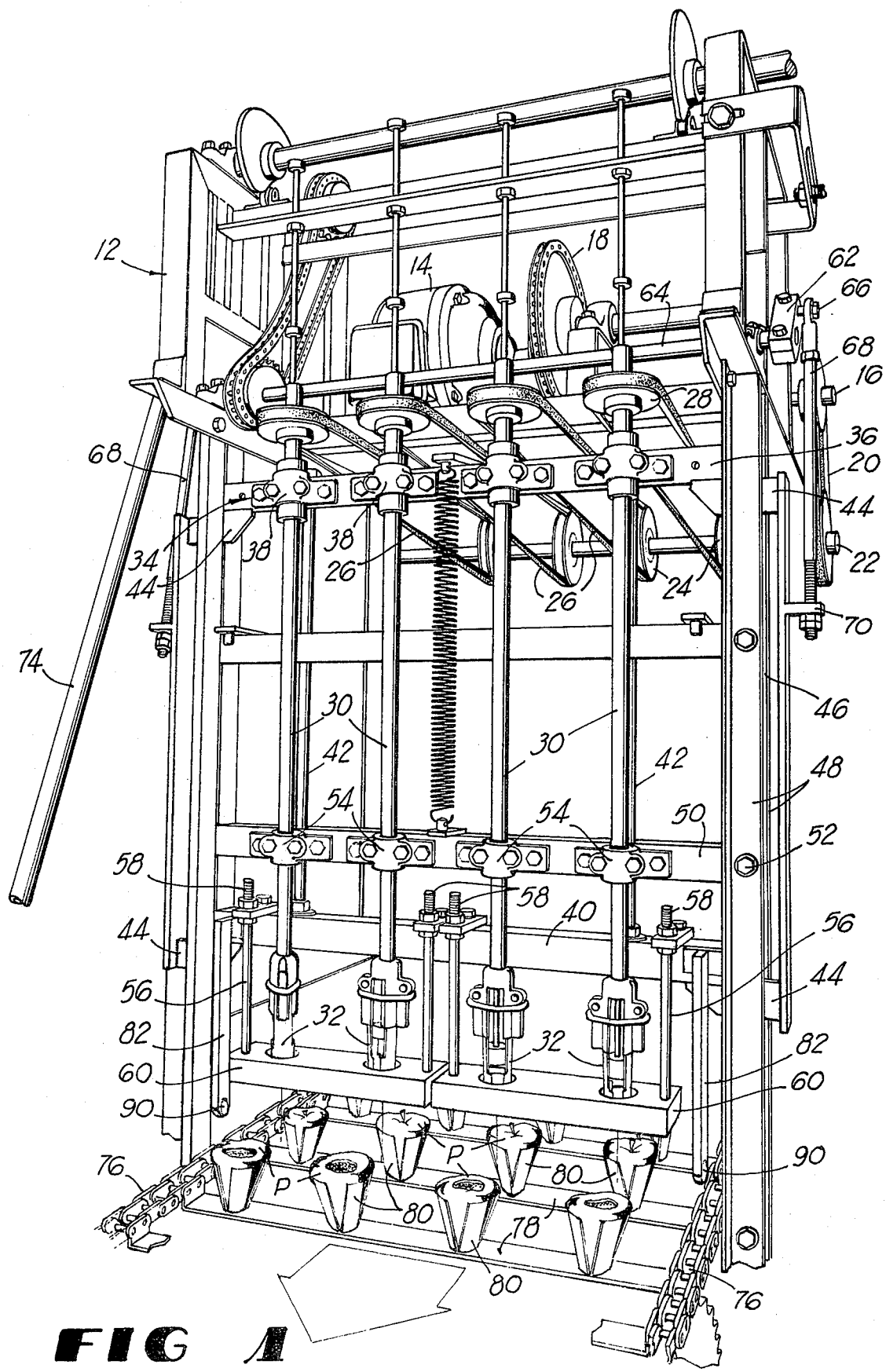
FIG. 1 is a perspective view of a machine for coring pimentos or the like according to the invention.

Referring to the drawings in detail wherein like numerals designate like parts, a pimento coring machine constructed substantially according to the disclosure in U.S. Pat. No. 2,683,477 to Altman and including the improvement in accordance with this invention comprises a main frame 12 upon which is mounted a drive motor 14 powering a driven horizontal transverse shaft 16 through a chain drive 18. The shaft 16 is connected through a belt 20 to a coring knife shaft 22 which drives pulleys 24 engaged with belts 26 which in turn engage and drive pulleys 28 of vertical axis spaced parallel rotating shafts 30 carrying at their lower ends pimento coring knives 32.

The rotating knife shafts 30 are bodily carried on a vertically reciprocating carriage 34 having an upper horizontal transverse cross bar 36 carrying journals 38 for the vertical shafts 30. The carriage 34 also includes a lower cross bar 40 rigidly connected with the other cross bar 36 by spaced vertical bars 42.

Figure 2:
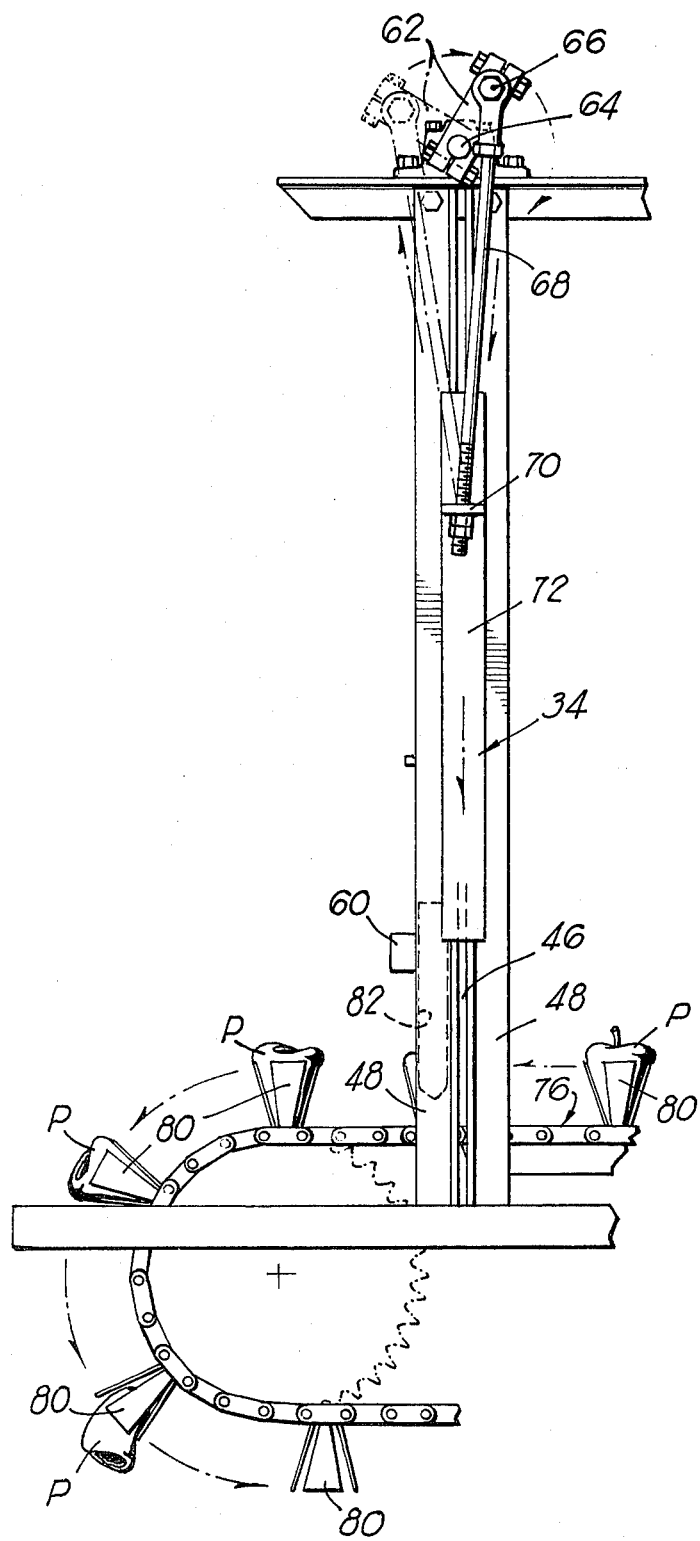
FIG. 2 is a fragmentary side elevation of the machine showing the knife carriage in its topmost position.

The carriage 34 is equipped with opposite side guide tabs 44 securely welded to the upper cross bar 36 and projecting outwardly through guide slots 46 formed by spaced vertical angle bars 48, FIG. 2, forming parts of the main frame 12.

An additional main frame cross bar 50 is securely connected as at 52 to the angle bars 48 and mounts additional journals 54 within which the knife shafts 30 reciprocate and rotate.

The lower cross bar 40 of carriage 34 supports spaced vertical suspension rods 56 having their upper ends 58 threaded for vertical adjustment of the rods. The suspension rods 56 slidably support product stripper blocks 60 which rest upon the lower heads of the rods 56, not shown, under the influence of gravity.

Figure 3:
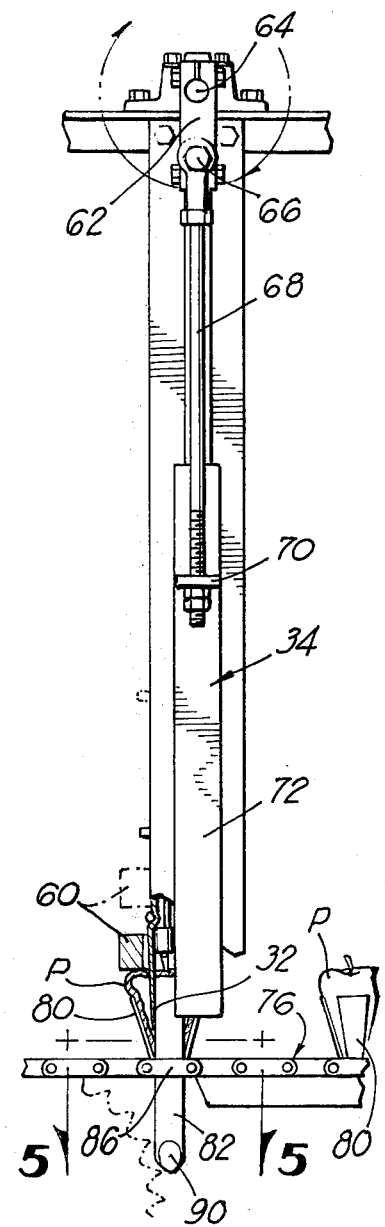
FIG. 3 is a similar view showing the knife carriage in the lowermost position.

When the carriage 34 descends to core pimentos or the like, the stripper blocks 60 engage the tops of the fruit, as shown in FIG. 3, and on the rise of the carriage strip the fruit from the coring knives 32.

The carriage 34 is raised and lowered by a crank 62 which is driven by a power transfer shaft 64. The crank 62 at its distal end carries a crank pin 66 connected with a screw-threaded adjustable crank link 68 or rod. This rod at its lower end is received thrugh an apertured tab 70, fixed to a side vertical member 72, welded to the guide tabs 44 on each side of the reciprocating carriage 34. That is to say, the carriage drive cranks 62, rods 68 and members 72 are provided on opposite sides of the machine to assure smooth carriage operation.

One full revolution of the cranks 62 will produce a full reciprocation of the knife carriage 34 downwardly and upwardly. In timed relationship with the reciprocation of the knife carriage, a ratchet arm 74 is operated to move the product conveyor chains 76 in a step-by-step mode through a distance equal to the spacing of parallel transverse conveyor support bars 78 carried by the chains 76 and supporting equidistantly spaced rows of conically tapered cups 80 within which the pimentos P are held, all in accordance with the Altman patent.

The step-by-step travel of the conveyor composed of chains 76 and support bars 78 is synchronized with the reciprocation of the knife carriage 34 so as to cause the cups 80 and pimentos to stop or dwell directly under the rotating coring knives 32 as the carriage 34 descends.

However, in practice, this synchronization in the machine is not always perfect and when it is not, the cups 80 may not be coaxially aligned with the knives 32 when the latter descend, in which case the knives may strike the sides of the cups 80 which are formed of stainless steel and thus destroy the cups or knives or both. This is highly undesirable because metal parts can enter the food product and expensive repairs on the coring machine will be necessitated.

To avoid this serious problem experienced in the Altman machine, a mechanical means for detecting or sensing a non-synchronous relationship between the product conveyor and the reciprocating knife carriage is provided in accordance with the main feature and objective of the invention.

The mechanical sensing means comprises a pair of rigid vertical probes 82 fixed dependingly to the lower carriage cross bar 40 and projecting well below the latter in vertical alignment with the two horizontal chains 76 of the product conveyor. The rigid probes 82 are cross sectionally sized and shaped to enter one of the generally rectangular spaces 84 of each chain between a pair of side links 86 and an adjacent pair of cross rollers 88 of the chain. The lower tips of the probes 82 are preferably bulbous and tapered as at 90 for smooth guidance of the probes into the spaces 84.

Figure 5:
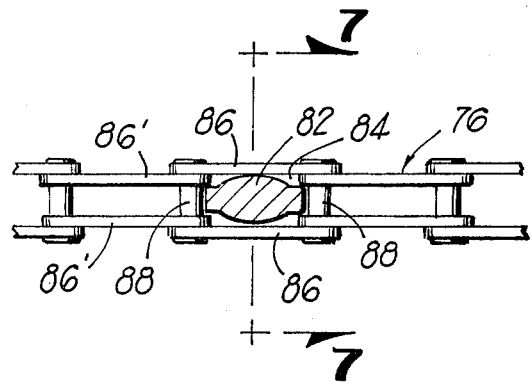
FIG. 5 is an enlarged fragmentary horizontal section taken on line 5—5 of FIG. 3.
Figure 7:
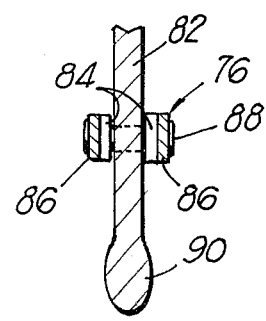
FIG. 7 is a fragmentary vertical section taken on line 7—7 of FIG. 5.

When the chains 76 are properly synchronized with the reciprocating carriage 34 during the operation of the machine, the probes 82 will enter a pair of the chain spaces 84 on each descent of the carriage, and the rotating coring knives 32 will penetrate the pimentos P centrally and coaxially of the cups 80 to cleanly remove the pimento cores without the problem of the knives striking the cups. The cored pimentos are indicated in FIG. 1 in advance of an uncored row of pimentos. The conveyor chains 78 will be at a dwell and therefore stationary relative to the probes 82 when the latter descend into the chain spaces 84. The probes 82 do not affect or change the regular mode of operation of the otherwise conventional coring machine, as previously stated. FIGS. 3, 5 and 7 of the drawings show the sensing probes 82 in their full down positions with the carriage 34 under influence of the rotating cranks 62 and associated parts. FIG. 2 shows the carriage 34 and probes 82 substantially at their full up positions with the probes above and clear of the conveyor chains 76.

Figure 4:
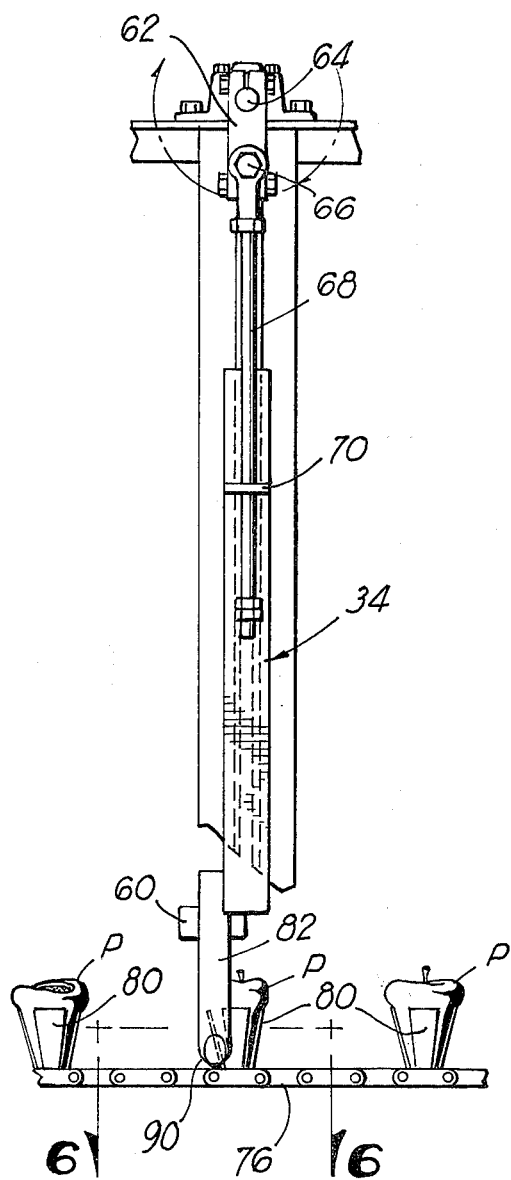
FIG. 4 is a similar view of the machine with the sensing probe engaging a roller of the dwelling conveyor chain and arresting descent of the knife carriage somewhat above its full down position.
Figure 6:
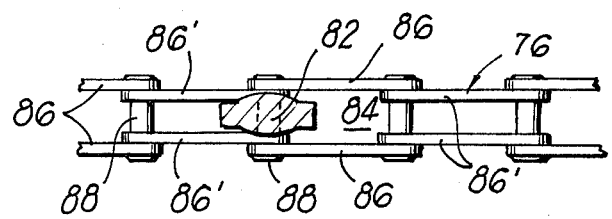
FIG. 6 is a similar view taken on line 6—6 of FIG. 4.

If the chains 76 and reciprocting knife carriage are not perfectly synchronized as can sometimes occur in practice, the chain openings 84 will not be aligned with the rigid probes 82 during the dwell of the chains and the descent of the carriage 34. Instead, one of the chain rollers 88 will be aligned or partly aligned with the probes 82 and the descending probes will engage the chain rollers 88 as shown in FIGS. 4 and 6 to positively arrest the downward movement of the carriage and coring knives 32 so that the knives cannot strike and destroy cups 80 and/or themselves. In other words, when the probes 82 strike the chain rollers 88 and are unable to enter the openings 84, the reciprocating carriage 34 is prevented from reaching its full down position shown in FIG. 3, for example.

When the descent of the carriage 34 is arrested by engagement of the probes 82 with parts of the chains 76, the cranks 62 can continue to turn without damaging the carriage or its drive mechanism. This is true because of the lost motion connections of the links 62 with the carriage 34 through the apertured tabs 70. In effect, the carriage can simply float at the elevation where its downward movement is terminated by the probes 82 and the links or rods 68 can reciprocate through the tabs 70. This is another difference in the construction of the machine over the Altman patent and is a necessary feature in conjunction with the rigid probes 82.

It should be pointed out that, in addition to being blocked by the chain rollers 88 when the conveyor and carriage are not synchronized, the probes may also be blocked by the inability of their bulbous heads 90 to enter between the more narrowly spaced chains links 86′, and the probes can only pass freely between the more widely spaced links 86, as shown in FIG. 5, when the machine is properly synchronized.

FIG. 3 shows the stripper blocks 60 in contact with the tops of the pimentos P when the carriage 34 is in the full down position and the knives 32 are coring the fruit. As the carriage begins its ascent, the gravity biased blocks 60 will initially remain down long enough to assure complete withdrawal of the knives 32 from the pimentos without lifting the latter from the cups 80.

Except for the features of the sensing probes 82, the lost motion connections between the drive cranks 62 and carriage 34, and the gravity biased stripping members 60, the construction and mode of operation of the machine corresponds to the Altman patent and need not be further described.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a machine for coring pimentos and the like, a conveyor transporting pimentos to and from a coring position and dwelling at the coring position, a reciprocating coring knife carriage at the coring position and moving at substantially right angles to the path of movement of the conveyor toward and away from the conveyor whereby coring knives on said carriage can remove cores from pimentos and the like on the conveyor while the conveyor is dwelling and the carriage is substantially at its nearest proximity to the conveyor, the movements of the conveyor and carriage being synchronized but also being subject to non-synchronization at certain times, the improvement comprising mechanical means on the carriage and reciprocating with the carriage and entering an open space of the conveyor without contacting the conveyor when the carriage is at said nearest proximity to the conveyor and the conveyor and carriage are in proper synchronization, and the mechanical means engaging a mechanical part of the conveyor and thereby arresting movement of the carriage toward the conveyor substantially short of the nearest proximity of the carriage to the conveyor to prevent engagement of the coring knives of the carriage with product holding cups of the conveyor when the conveyor and carriage are out of synchronization.

2. In a machine for coring pimentos and the like as defined in claim 1, and the mechanical means on the carriage comprising at least a rigid sensing probe on the carriage projecting forwardly of its leading end and being in alignment with a portion of the conveyor having alternating open spaces and rigid mechanical elements.

3. In a machine for coring pimentos and the like as defined in claim 2, and said portion of the conveyor comprising a conveyor chain having alternating uniformly spaced cross rollers and open spaces, the movement paths of the chain and probe being substantially in a common plane.

4. In a machine for coring pimentos and the like as defined in claim 3, and the conveyor including a pair of opposite side parallel chains, and a pair of opposite side parallel probes on the carriage in common planes with the conveyor chains, and spaced product supports carried by the conveyor chains including product holders in alignment with the coring knives of the carriage.

5. In a machine for coring pimentos and the like as defined in claim 1, and a power drive means for the reciprocating carriage including a lost motion connection which can yield in one direction in response to engagement of the mechanical means with said mechanical part of the conveyor.

6. In a machine for coring pimentos and the like as defined in claim 5, and said lost motion connection comprising a connecting rod operated by a crank of the power drive means and engaged movably with an apertured element on the carriage.

7. In a machine for coring pimentos and the like as defined in claim 1, and a gravity biased product stripper member supported on the carriage below the lower end of the carriage and adapted to rest by gravity on the tops of pimentos or the like while the latter are being cored by coring knives on the carriage and continuing to rest on the pimentos during initial upward movement of the carriage a sufficient distance to withdraw said coring knives from the pimentos.

8. In a machine for coring pimentos and the like as defined in claim 7, and the gravity biased product stripper member comprising a block having openings coaxial with the coring knives of the carriage and receiving the latter movably, and suspension rods supporting said block slidably and being secured dependingly to the carriage.

9. A machine for coring pimentos and the like comprising an upright carriage frame, a substantially horizontal product conveyor near the bottom of the carriage frame including side conveyor chains and supports for spaced transverse rows of the product between said chains, said supports including transversely spaced product receptor cups, a carriage mounted for substantially vertical reciprocation on said frame, vertical axis rotary coring knives on said carriage reciprocating therewith and being in coaxial alignment with said cups during dwell periods of the conveyor when the conveyor and carriage are properly synchronized, power means drivingly connected with the carriage to reciprocate the carriage including a lost motion connection with the carriage which can yield when downward movement of the carriage is arrested, and a pair of substantially vertical rigid probes fixed to the carriage and reciprocating therewith and projecting below the bottom of the carriage and being substantially in vertical alignment with said conveyor chains, said probes entering and passing through spaces of the conveyor chains to thereby allow full downward movement of the carriage to a product coring position when the conveyor and carriage are properly synchronized, and the probes engaging parts of said chains to arrest downward movement of the carriage short of its full down product coring position when the conveyor and carriage are out of synchronization to prevent the rotary coring knives from engaging said cups of the conveyor.

10. A machine for coring pimentos and the like as defined in claim 9, and a gravity biased product stripping member guidably carried by said carriage and resting on the tops of pimentos and the like held in said cups during the coring of the pimentos and while the carriage is rising sufficiently to withdraw the coring knives from the pimentos.

11. A machine for coring pimentos and the like as defined in claim 10, and the product stripping member comprising a bar-like-member having openings coaxial with and receiving said coring knives, and substantially vertical suspension rods for the stripped member on said carriage slidably engaging the stripper member, the stripper member having guide openings receiving said rods.

12. A machine for coring pimentos and the like as defined in claim 9, and said probes having enlargements at the lower ends of the probes preventing the probes from entering spaces between closely spaced links of said chain and allowing them to enter the spaces between more widely spaced links of the chains.

* * * * *